United States Patent [19]

Koike

[11] Patent Number: 4,670,868
[45] Date of Patent: Jun. 2, 1987

[54] SIMPLIFIED SOUND REPRODUCING DEVICE HAVING A PLURALITY OF EXTERNAL SHAFT CORRESPONDING TO THE RECORDED ITEMS

[75] Inventor: Eishi Koike, Sagamihara, Japan
[73] Assignee: Ozen Corporation, Tokyo, Japan
[21] Appl. No.: 833,860
[22] Filed: Feb. 26, 1986

[30] Foreign Application Priority Data

Feb. 27, 1985 [JP] Japan .................................. 60-37891

[51] Int. Cl.⁴ ...................... G11B 25/04; A63H 5/00; A63H 29/00
[52] U.S. Cl. ...................................... 369/65; 369/67; 446/302
[58] Field of Search ...................... 369/63, 65, 66, 67; 446/299, 302

[56] References Cited

U.S. PATENT DOCUMENTS

| 2,978,836 | 4/1961 | Kato | 369/67 |
| 3,590,525 | 7/1971 | Tomare | 369/67 |
| 4,055,351 | 10/1977 | Hughes | 369/67 |
| 4,524,437 | 6/1985 | Koike | 369/67 |

*Primary Examiner*—Steven L. Stephan
*Attorney, Agent, or Firm*—Basile Weintraub Hanlon

[57] ABSTRACT

A simplified sound reproducing device having external output shafts disposed beneath the plane of rotation of a record disc and at positions corresponding to the starting point of sound reproduction of each record groove. Each of the external output shafts actuates predetermined external components for action corresponding to the content of the recorded item in the record groove. A transmission is provided for connecting a center pin to each of the external output shafts. The transmission includes a driving wheel fixed around the center pin, a revolvable bearing frame member which is journally connected for rotation with the center pin when under engagement with a coupling member, a planetary shaft carried by the revolvable bearing frame member, a planetary gear wheel supported by the planetary shaft capable of movement in an axial direction and rotated by meshing with the driving wheel. A pair of guide members fixedly disposed to the center pin, one positioned axially in front of and the other behind the driving wheel to hold the planetary wheel from both sides and to urge it to move axially together with the driving wheel, and driven wheels fixedly coupled to each external output shaft capable of meshing with the planetary wheel only when the pickup is supplied with stylus pressure. A coupling member is constructed such that the planetary shaft can be stationary, regardless of the rotation of the center pin, when the pickup is loaded with stylus pressure.

6 Claims, 7 Drawing Figures

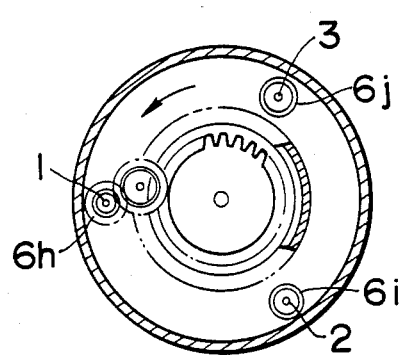
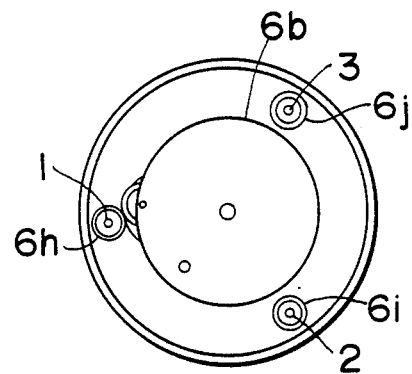
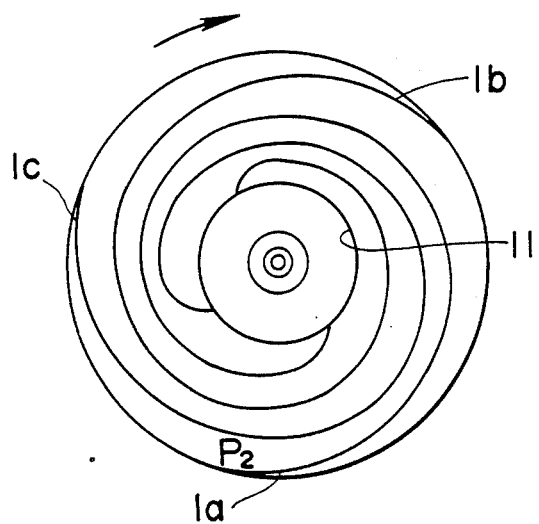

SIMPLIFIED SOUND REPRODUCING DEVICE HAVING A PLURALITY OF EXTERNAL SHAFT CORRESPONDING TO THE RECORDED ITEMS

BACKGROUND OF THE INVENTION

1. Field of the Invention

This invention relates to a sound reproducing device having a plurality of external output shafts corresponding to the number of recorded items, and more particularly, to a sound reproducing device which is able to select and actuate desired external output shafts for letting the external means, into which the reproducing device is incorporated, play a motion corresponding to the specific recorded item which is being reproduced.

2. Description of the Prior Art

A sound reproducing device in connection with and similar to the present invention is disclosed, for example, in British Patent Specification No. 123865. In the device of that patent, a gear means is connected to a center pin such that a motor as a power source can drive through said center pin, a moving means other than the record disc, thereby the moving means is actuated or driven.

Japanese Laid-Open Patent Publication No. 60(1985)-07601, discloses a simplified sound reproducing device having an external output shaft, in which a pickup is constructed to fall into a recess or cavity after one of the recorded items has finished its reproduction, accompanying advancing motion of the record disc together with the center pin fixed to the record disc, thus the gear fixed to the center pin engages or disengages the gear on the external output shaft. Incidentally, this laid-open patent application was made by the inventor of the present invention and is considered the art most relevant to the present invention.

Both of the devices described above are provided with a single output shaft so they are not able to select alternative external shafts in such a manner that the external means, into which the subject simplified sound reproducing device is incorporated, can play an action in harmony with the content of the respective recorded item each having different meaning and recorded in each of the plural number of recorded grooves, concurrent with the period when the selected item is under reproduction.

However, there have recently been increasing demands for toys, such as toy robots, capable of uttering voices including varying in content and meaning and also making various motions each corresponding to the voices or words which the toy is uttering.

There has been a pending problem encountered in the aforesaid devices in that they cannot satisfy the user's above-mentioned demands.

Accordingly, an object of the present invention is to furnish an improved type of sound reproducing device having a plurality of external shafts driven by the power of the sound reproducing device itself and enabling the external means to play various motions each corresponding to the content in each of the items to be reproduced.

SUMMARY OF THE INVENTION

The present invention relates to a simplified sound reproducing device having a plurality of external output shafts each corresponding to the content of each recorded item.

Each of the external output shafts is disposed below the rotational plane of the record disc and at a position corresponding to the starting point of sound reproduction of each recorded groove. A center pin is fixedly disposed to the record disk and a transmission connects said center pin to each of the external output shafts.

This transmission includes a driving wheel fixed around the center pin; a revolvable bearing frame member which is journally received so as to be rotated together with the center pin under engagement with a means for coupling, when the center pin and record disc are completely retracted against a stylus force spring by applying depression force through a depression pole; a planetary shaft carried by the revolvable frame; a planetary wheel supported by the planetary shaft capable of being movable in axial direction and rotatable while meshing with said driving wheel; a pair of guide members allowing said planetary wheel to mesh with said driving wheel and fixedly disposed to said center pin, one positioned axially in front of and the other positioned axially behind the driving wheel so as to hold the planetary wheel from both axial sides thereby urging the planetary wheel to move axially together with said driving wheel; driven wheels fixedly coupled to each external output shaft so that said planetary wheel can be meshed therewith only when said pickup is imparted with stylus pressure.

The coupling member is constructed in such a manner that the planetary shaft can be stationary while the center pin rotates, which occurs only when the pickup is loaded with stylus pressure and the planetary wheel meshes with one of the driven wheels, thereby being in a replay position.

In addition, each of said external output shafts is designated its role or intended use to actuate separate external means to play respective action corresponding to the item recorded in each of the record grooves, that is, the locations of the external output shafts are set at such positions in the phase of rotation of the record disc that said planetary wheel can engage with one of the driven wheels of the output shafts corresponding to the recorded groove, with which the pickup engages.

The switch in the circuit to the power source is arranged to open when the pickup falls into the stylus receiving recess and to close when the record disc is completely retracted by the depression pole and the pickup is imparted with stylus pressure.

When the pickup falls into the stylus receiving recess, after having finished any one sound reproduction by tracing the record groove, and the record disc is allowed to advance together with the center pin by being urged by the stylus force spring, both the driving wheel and the guide members being fixedly attached to the center pin, also advance upward. The planetary wheel, journally received by the planetary shaft carried by the revolvable bearing frame and movable in axial direction, also advances in the axial direction, while being guided by the guide members and in meshing with the driving wheel, to a position in advance of the position where the driven wheels are fixed to their respective external output shaft, which results in the planetary wheel being rendered out of engagement with any of the driven shaft. At this instance, the switch in the power circuit opens to cut supply of electricity to the motor, and thus the motor stops its rotation.

When the record is completely retracted by pushing down the depression pole, the switch in the circuit will close to start the motor and then the coupling means is coupled accompanying rotation of the entire transmission. Since the planetary wheel in the transmission situates at the rear side of the driven wheels of the external output shafts, while in the retracted position it does not engage any of the driven wheels. Subsequent releasing of the depression pole, because of the fact that the pickup has already reverted back to the starting point of sound reproduction above the record face of the record disc, the record disc will advance to a replay position, that being the point where it can be supported by the pickup, and the planetary wheel will also shift its rotational plane to the position where it can be meshed with one of the driven wheels. Further revolution of the planetary wheel due to inertia or friction with the center pin, renders the planetary wheel to contact and engage one of the driven wheels. By this engagement, the external output shaft of the driven wheel is actuated. At this replay position a coupling member is constructed to be released from its previous coupled position while the center pin continues to rotate. This can be done, in a frictional type of coupling member, by the rotation of the center pin with a force exceeding the selected friction force. While in the case of a locking type of coupling member, for example, this can be done by letting the projection formed on the guide member escape out of the through hole formed on the revolvable bearing frame member so as to release the coupling of the revolvable bearing frame member with the center pin.

BRIEF DESCRIPTION OF THE DRAWINGS

FIG. 5 is a sectional plan view taken along line 5—5 of FIG. 2;

FIG. 6 is a sectional plan view taken along line 6—6 of FIG. 2 and

FIG. 7 is a plan view showing the top face of a record disc.

Explanation will now be on the preferred embodiment of the present invention by referring to the accompanying drawings as mentioned above.

DETAILED DESCRIPTION OF THE PREFERRED EMBODIMENTS

Figure 1:
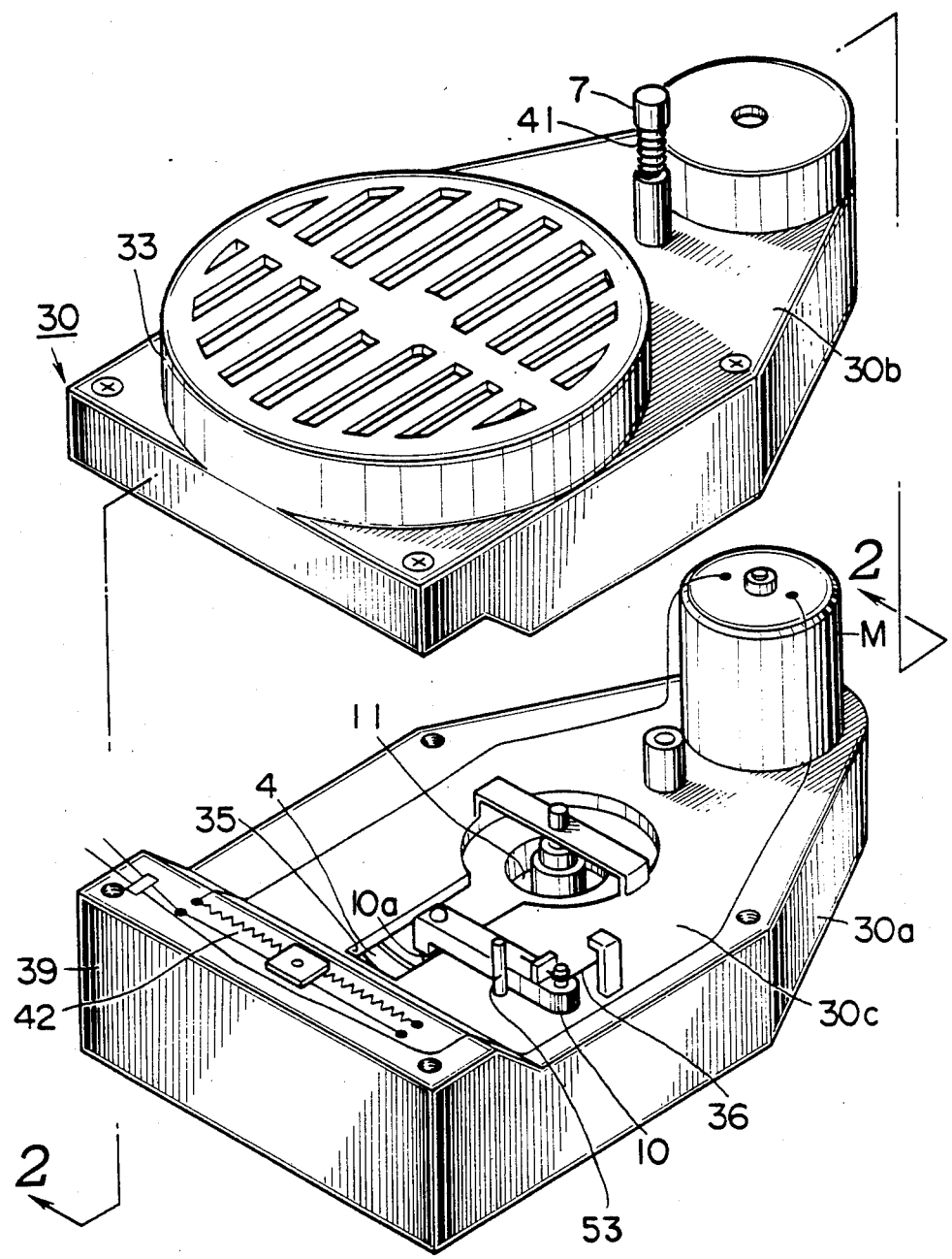
FIG. 1 is an exploded perspective view of an embodiment of the simplified sound reproducing device according to the present invention.
Figure 2:
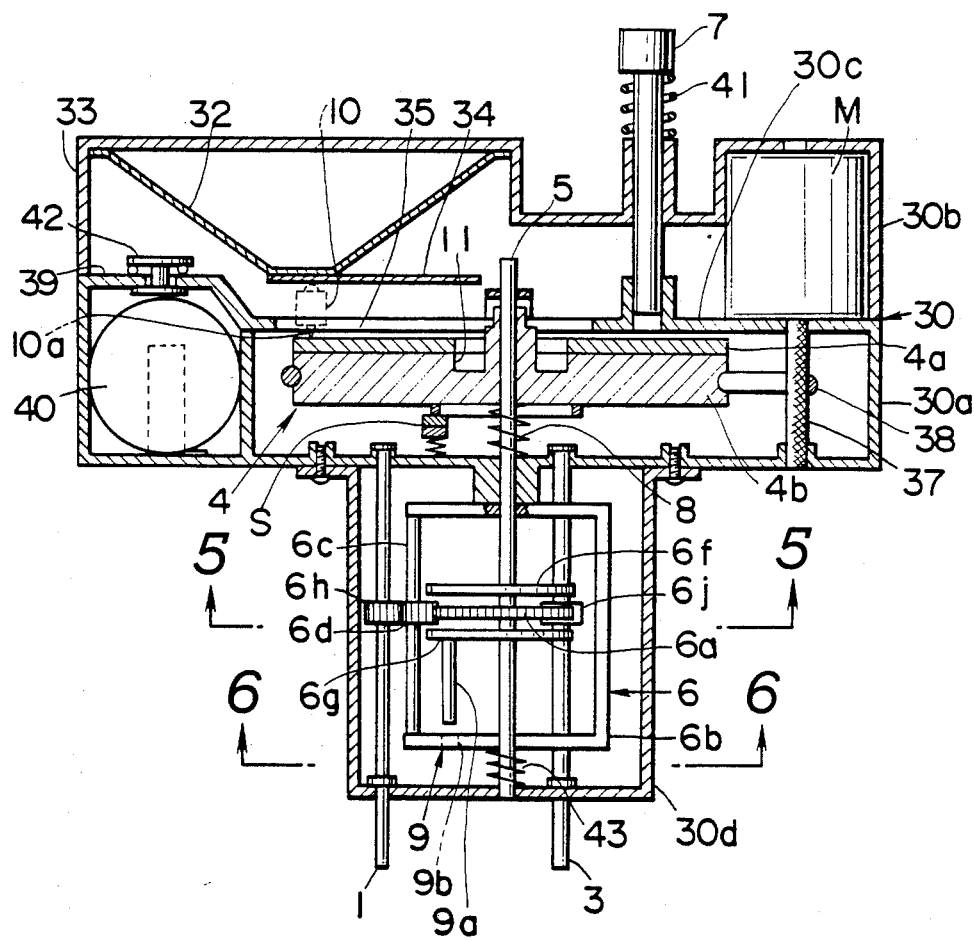
FIG. 2 is a sectional side view of the embodiment taken along line 2—2 of FIG. 1.

FIG. 1 is an exploded perspective view showing an embodiment of the present invention and FIG. 2 is a sectional side view of the simplified sound reproducing device shown in FIG. 1 as assembled. As can be seen from these figures, a casing 30 consists of a portion comprising a chassis 30a, a housing 30b, and a portion of gear box 30d.

A diaphragm box 33 is formed on the housing 30b, within which a speaker diaphragm 32 is fixedly disposed. At the bottom of the speaker diaphragm 32 a sound transmitting member 34 is attached to extend horizontally therefrom. On the upper end of the chassis 30a, a middle deck 30c is placed to extend in horizontal direction, onto which a pickup 10 is swingably attached at its rear end. A reproduction stylus 10a projects downward from the forward tip end of the pickup 10 which can be rotated along the top plane of the middle deck 30c and can be swung in the direction toward said middle deck 30c.

Within the chassis 30a, a record disc 4 is received having at its center a fixedly attached center pin 5 capable of being rotated in horizontal direction and axially shifted. A stylus force spring 8 is shown in FIG. 2, by which the record disc 4 is normally biased resiliently toward the sound transmitting member 34.

The record disc 4 consists of a sound reproducing portion 4a and a turntable 4b. The top face of the sound reproducing portion carries three record grooves 1a, 1b and 1c shown in FIG. 7 being involutely engraved. In this embodiment, a starting point of each record groove is placed at the outer periphery of the record disc 4 and the end points are positioned at the inner part near the central part of the record disc.

An annular recess having a flat bottom is formed at the central part of the record disc 4 to constitute a stylus receiving recess 11, that is, a portion into which the stylus can drop. Each end point of the record grooves 1a, 1b and 1c, respectively, is further guided to the stylus receiving recess 11.

Outer side periphery of the turntable 4b of the record disc 4 is formed to be used as a pully, and a groove is formed therearound for this purpose.

In the portion of the middle deck 30c under which the sound transmitting member 34 extends, an oblong aperture 35 is formed, through which the sound reproduction stylus 10a projecting from the tip end of the pickup 10 can proceed onto the record face of the sound reproducing portion 4a to engage any one of the record grooves 1a, 1b and 1c. Thus, the tip end of the pickup 10 is normally positioned between the sound transmitting member 34 and the record disc 4.

At the swing point at the rear end of the pickup 10, a return spring 36 shown in FIG. 1, is attached, by which the front tip end of the pickup 10 is normally biased resiliently in two directions, the first bias to move toward the starting point of sound reproduction and the second bias to move away from the record disc.

A motor M is fixedly mounted on the middle deck 30c, the output shaft 37 of which extends within the chassis 30a parallel to the center pin 5, with its side face to be confronted with the outer side periphery of the turntable 4b. In FIG. 2, a belt 38 extends between the output shaft 37 and the turntable 4b.

FIGS. 1 and 2, depict a battery box 39 and a battery 40 housed therein, by which the motor M is supplied with electricity. A depression pole 7 is normally and resiliently urged outward by a coil spring 41, the front tip end (lowermost) confronting the record face of the record disc 4.

Pushing down on the depression pole 7 against the urging given by the coil spring 41, gives rise to the retraction of the record disc 4 against the stylus force spring 8.

Shown in FIGS. 1 and 2 is a speed controller 42 composed of a slide rheostat.

Shown in FIG. 1 is a stop 53 for the pickup 10, by which the pickup 10 is restricted from radical movement outside the starting point of sound reproduction.

Figure 3:
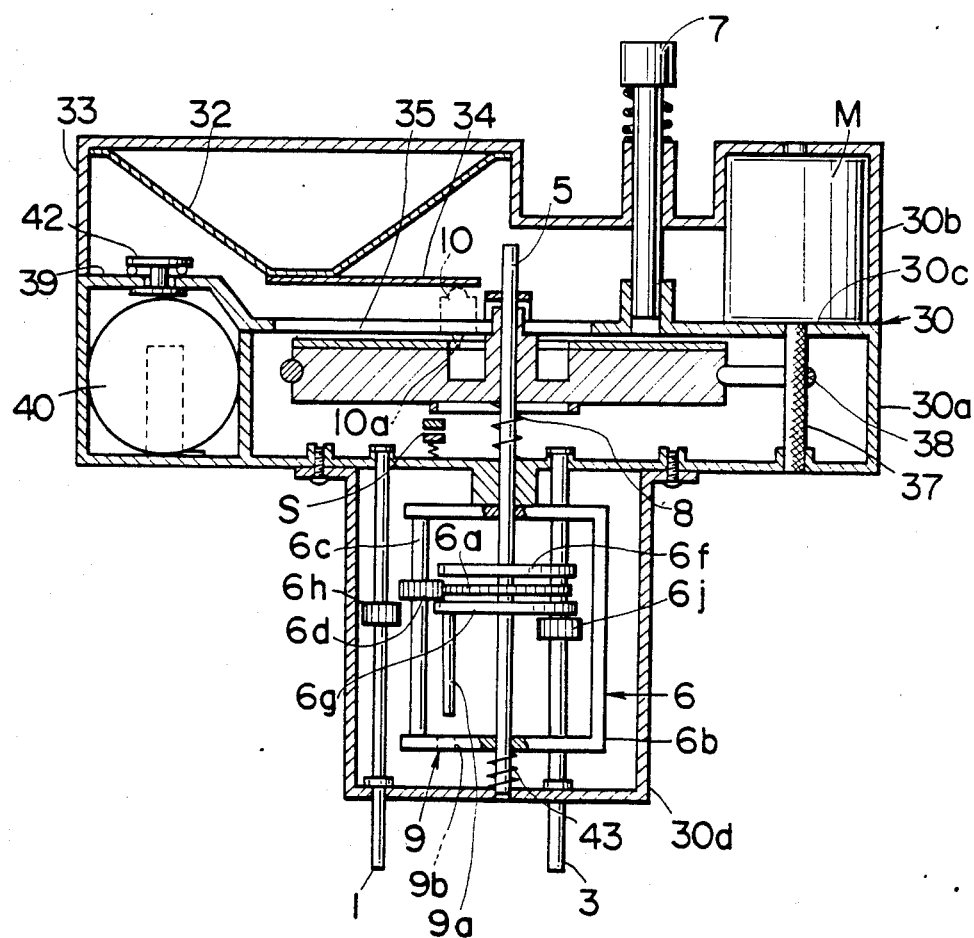
FIG. 3 is a sectional side view similar to FIG. 2 showing the pickup fallen into the stylus receiving recess.
Figure 4:
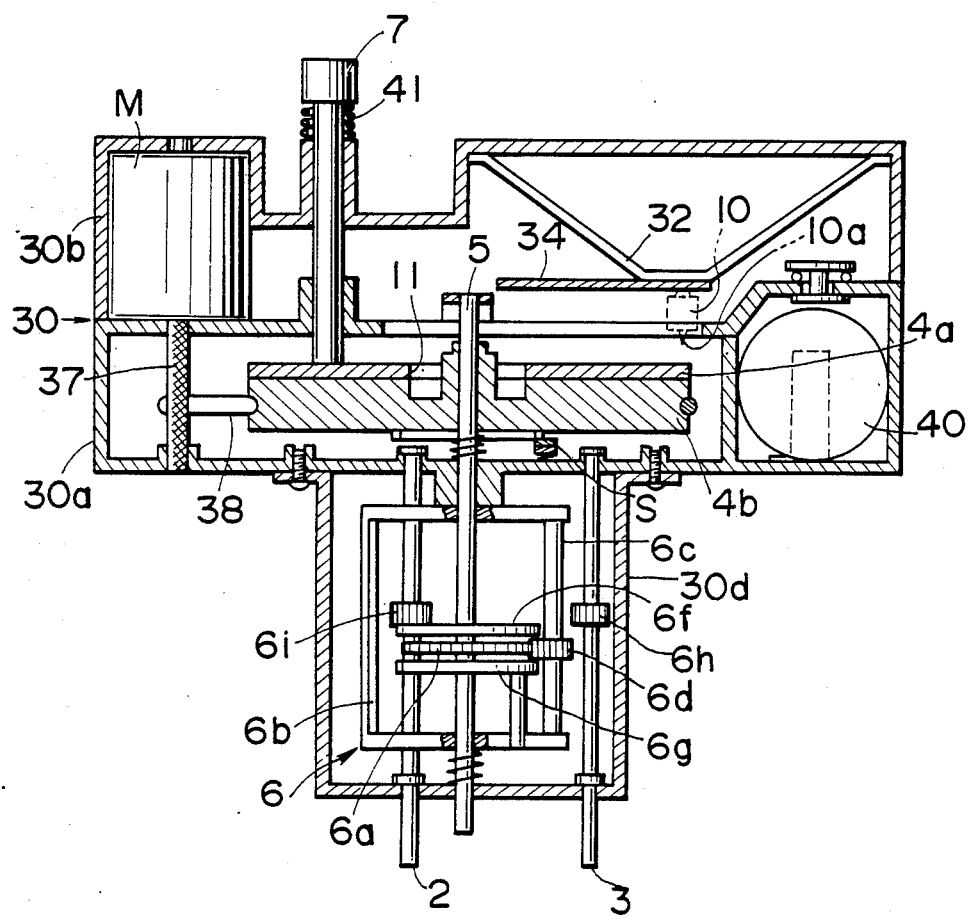
FIG. 4 is a sectional side view showing the interior of the device when the depression pole is pushed down.

As shown in FIGS. 2, 3 and 4, a switch S is disposed, beneath the turntable 4b, and on the bottom plate of the chassis 30a, and is arranged to be closed by being urged by the bottom of the turntable 4b when the pickup 10 is applied with stylus pressure. A gear box 30d projects from chassis 30a, into which the center pin 5 extends, being journally received by the chassis 30a.

Three external output shafts 1, 2 and 3 are journally received by the bottom plate of the chassis beneath the rotating plane of the record disc 4, and are positioned around the center pin 5. A forward tip end of each external output shaft projects through and beyond the bottom plate of the gear box 30d. These external output shaft 1, 2 and 3 are positioned to be correlated to the content of the item recorded in the record groove 1a, 1b and 1c, respectively.

Mounted within the gear box 30d is a means for selectively transmitting rotational motion from the center pin 5 to the external output shafts, such as a transmission 6. This transmission includes a driving wheel, such as a driving gear wheel 6a, fixed axially to the center pin 5, a pair of guide members 6f and 6g also attached axially to the center pin on each side of the driving wheel, that is, at the advancing side and at the retracting side; a revolvable bearing frame member 6b which is journally received to be freely relative to both the direction of revolution and axial movement; a planetary shaft 6c carried in parallel with said center pin 5 by the revolvable frame 6b; an intermediate wheel, such as a planetary gear wheel 6d supported by the planetary shaft 6c, capable of being movable in axial direction and rotatable while meshing with said driving wheel 6a and restricted by the pair of guide members 6f and 6g; driven wheels, such as driven gear wheels 6h, 6i and 6j, fixedly coupled to each external output shaft 1, 2 and 3, so that each gear wheel can be meshed with said planetary wheel 6d only when said pickup 10 is applied with stylus pressure. The driven wheels are fixed to said output shaft 1, 2 and 3 at the axial position where said driving wheel 6a and said planetary wheel 6d are in a replay position corresponding to when said pickup 10 is applied with stylus pressure. The driven wheels are fully out of engagement with said driving wheel 6a and said planetary wheel 6d when said driving wheel 6a and said planetary wheel 6d are at a completely retracted position by being urged by depression of the depression pole 7, and also are out of engagement when said driving wheel 6a and said planetary wheel 6d are in a completely advanced position, as when said pickup 10 has fallen into said stylus receiving recess 11.

The condition under which both the driving wheel 6a and the planetary wheel 6d can advance is when any one of the specific record grooves has finished its sound reproduction and the pickup 10 has fallen into the stylus receiving recess 11 of the record disc 4. The the record disc has advances accompanying the center pin 5, by being urged by the spring force of the stylus force spring 8. The driving wheel 6a and the planetary wheel 6d can retract when the record disc 4 and the center pin 5 together are retracted against the resilient force of the stylus force spring 8 by depression of the depression pole 7.

Subsequent releasing of the depression pole 7 maintains the pickup 10 under stylus pressure by being clamped between the record disc 4 and the sound transmitting member 34 retains the record disc 4 at its replay position, by virtue of this, planetary wheel 6d can be held at the position where it can be revolved in the plane where said driven wheels 6h, 6i and 6j are fixed.

In FIGS. 2, 3 and 4, a buffer spring 43 is shown.

The revolvable bearing frame member can be rotated by engaging means which couple the revolvable bearing frame member to the center pin. For example, the coupling means can be constructed by providing the guide member 6g, on the axial retraction side of the driving wheel 6a, with a projection 9a in parallel with the center pin 5, while the portion of the revolvable bearing frame member 6b, confronting the guide member 6g, can be formed as a circular disc with a through hole 9b at a location radially corresponding to the tip end of the projection 9a. This projection 9a and hole 9b constitute a coupling means, collectively referred to as a coupling member 9.

The projection 9a, of the coupling member 9, as shown in FIG. 3, does not engage through hole 9b of the coupling means when the reproducing device replays any one of the specific record grooves 1a, 1b, or 1c, concluding with the pickup 10 falling into the stylus receiving recess 11, resulting in an axially advancing movement of the record disc 4 together with the center pin 5 by means of the resilient force imparted by the stylus force spring 8. The projection 9a is inserted into the through hole 9b, as shown in FIG. 4, when the record disc 4 is retracted together with the center pin 5, against the resilient force of the stylus force spring 8 by an external force depressing the depression pole 7 which returns the pickup 10 to the replay position at the starting point of sound reproduction and places the pickup 10 under stylus pressure.

When the coupling member 9 is in its disengaged position, as shown in FIGS. 2 and 3, the revolvable bearing frame member 6b cannot be driven by the center pin 5, however, when the coupling member 9 is in its engaged state as shown in FIG. 4, the revolvable bearing frame member 6b is rotated together with the center pin 5.

The condition under which the coupling member 9 is placed in engagement is when the record disc 4 is retracted together with the center pin 5 by the depression pole 7 as explained above. At this instance, the projection 9a in the coupling member 9, at first, slidably contacts the inside face of the revolvable bearing frame member 6b, thereby the revolvable bearing frame member 6b will retract while being supported by the buffer spring 43 and thus the excessive force by the depression pole can be absorbed.

The timing when the projection 9a engages the revolvable bearing frame member 6b shall be set where the planetary wheel 6d has positioned behind the end face in the retracting direction of the driven wheels 6h, 6i and 6j.

The revolvable bearing frame member 6b rotates slightly due to the friction with the projection 9a, the projection 9a will eventually reach the through hole 9b and enter into it, provided that the strength of the buffer spring 43 is suitably settled.

It is apparent that the coupling means is not always required to be the combination of a projection and a hole, but any other coupling means can be used in which a center pin and the revolvable frame member can be frictionally rotated and the center pin alone can rotate when the planetary wheel has stopped its revolution by striking one of the driven wheels.

Explanation will be made in what manner the device in accordance with the embodiment as mentioned above operates.

When the pickup 10 is loaded with stylus pressure, as shown in FIG. 2, if a starting switch is turned ON, the motor M will start rotation, which rotates the record disc 4 through the belt 38. Assuming that the pickup 10 is set to trace, one of the three record grooves, the record disc 4 and the center pin 5 are kept in position by the speaker diaphragm 32, sound transmission member 34 and the pickup 10, and as a consequence, the planetary wheel 6d is aligned to mesh with any one of the driven wheels 6h, 6i or 6j.

When the pickup 10 falls into the stylus receiving recess 11 formed on the central part of the record disc 4, the planetary wheel 6d will advance being urged by the guide member 6g up to a plane above the driven wheels 6h, 6i and 6j thereby the planetary wheel 6d can not engage any of the driven wheels. At this moment, the switch S opens and cuts the power to the motor, thereby the motor will stop its rotation.

If the depression pole 7 is depressed by an external force, then the record disc 4 completely retracts, the switch S will close and the motor M is actuated and rotates the record disc 4, and the planetary wheel 6d is moved and positioned being out of engagement with the driven wheel 6h, 6i and 6j at the retracted position.

At this moment the coupling means engages, by the projection 9a slidably contacting the revolvable bearing frame member 6b until the projection 9a falls into the through hole 9b and the revolvable bearing frame member 6b is rotated while planetary wheel 6d is rotating.

Releasing the depressive external force on the depression pole 7 results in slight advancing of the record disc 4 accompanying stylus pressure on pickup 10.

In this case, the position to which the planetary wheel advances, namely, after the stylus pressure is imparted, the stylus is placed in the introductory portion P2 of the record groove 1a in its direction of rotation, the planetary wheel 6d will engage the driven wheel 6h of the external output shaft corresponding to the recorded item and drives the external output shaft.

Since the output shaft 1 is selected as a driving shaft for playing an action having a sense corresponding to the content in the record groove 1a, it is possible to let the external means, incorporated in conjunction with the sound reproduction devices of the present invention, play an action or motion corresponding to the content of the recorded item in the record groove 1a while the device is reproducing the item recorded in the record groove.

It has been made possible to render the external means incorporating the device of the present invention to play a plurality of actions or motions corresponding to each reproduced item by relying only on the power means incorporated in the sound reproducing device.

I claim:

1. A simplified sound reproducing device comprising:
   a casing;
   a record disc enclosed within said casing having a record face with a plurality of record grooves having a starting point of sound reproduction and a stylus receiving recess at a portion on or passing over an end point of sound reproduction;
   a motor for driving said record disc;
   means for transferring rotational motion from said motor to said record disk;
   a speaker diaphragm fixedly disposed to said casing above said record disc;
   a sound transmitting member disposed on the bottom of said speaker diaphragm and extending in the direction parallel to the record face of said record disc;
   a stylus force spring urging said record disc toward said sound transmitting member;
   a depression pole disposed having one end facing said record face and another end extending outside of said casing to retract said record disc by an external force depressing said pole against the urging of said stylus force spring;
   a pickup interposed between said sound transmitting member and said record disc, said pickup is normally urged toward both the starting point of sound reproduction and said sound transmitting member so as to be returned to said starting point of sound reproduction when said record disc is retracted by said external force depressing said depression pole;
   a record disc switch located below said record disc which is closed when the record disc is retracted by said external force on said depression pole sending electricity from a battery through a speed controller to said motor;
   a rotatable center pin fixedly attached to the center of rotation of said record disc capable of being rotated and axially advanced or retracted into three positions, wherein a completely advanced position corresponds to a first position when said pickup has fallen into said stylus receiving recess, a completely retracted position corresponds to a second position when said record disc is subjected to an external force on said depression pole, thereby moving said record disc against the urging of said stylus force spring, and a replay position corresponding to a third position when said pickup is placed under stylus pressure;
   a plurality of external output shafts disposed beneath the plane of rotation of said record disc and at locations corresponding to each of said starting points of sound reproduction of said record grooves on said record disc, wherein each of said external output shafts actuates predetermined external components corresponding to said record groove's recorded content being reproduced; and
   means for selectively transmitting rotational motion from said center pin to one of said plurality of external output shafts.

2. The simplified sound reproducing device of claim 1, wherein said selective transmitting means comprises a transmission having;
   a driving wheel fixed around said center pin below said record disc;
   a revolvable bearing frame member attached to said center pin enveloping said driving wheel, wherein said revolvable bearing frame member can be stationary when said pickup is applied with stylus pressure and said revolvable bearing frame member can be rotated about said center pin and moved in an axial direction;
   means for biasing said revolvable bearing frame member in an axial direction;
   means for coupling said revolvable bearing frame member with said center pin whereby said revolvable bearing frame member can be rotated in response to said coupling means being engaged;
   a planetary shaft carried by said revolvable bearing frame;
   a planetary wheel supported by said planetary shaft and capable of being movable in axial direction and is rotatable while meshed with said driving wheel;
   a pair of guide members fixedly disposed to said center pin, one at a position axially in front of said driving wheel and the other at a position axially behind said driving wheel, wherein said pair of guide members allow said planetary wheel to mesh with said driving wheel while holding said planetary wheel from both sides thereby urging said planetary wheel to move axially together with said driving wheel;

a plurality of driven wheels, wherein one driven wheel is fixedly coupled on each of said external output shafts, so that each driven wheel is out of engagement with said planetary wheel when said driving wheel and said planetary wheel are in the completely advanced position, and also being out of engagement with said planetary wheel when said driving wheel and said planetary wheel are in a completely retracted position, and being in engagement with said planetary wheel when said driving wheel and said planetary wheel are in a replay position, said driven wheels being fixedly positioned in the plane of rotation of said planetary wheel when said planetary wheel is in said replay position whereby said planetary wheel engages one of said plurality of driven wheels on one of said plurality of external output shaft corresponding to said record groove's recorded content with which said pickup engages.

3. The simplified sound reproducing device of claim 2, wherein said coupling means comprises frictional coupling means.

4. The simplified sound reproducing device of claim 2, wherein said coupling means comprises:
a coupling member projecting parallel to said center pin from one of said pair of guide members; and
said revolvable bearing frame member having a through hole formed on one end confronting said coupling member, wherein, said revolvable bearing frame member is normally and resiliently urged by said biasing means toward the advancing direction, and depressing said depression pole causes said center pin to retract, thereby moving said guide members, being fixedly disposed to said center pin, in a retracting direction, resulting in said coupling member slidably contacting said revolvable bearing frame member until said through hole is encountered, whereupon said coupling member enters into said through hole thereby imparting rotational motion to said revolvable bearing frame until said depression pole is released, whereby said coupling member exits from said through hole, thereby disengaging said coupling means.

5. The simplified sound reproducing device of claim 2, wherein each of said driving wheel, planetary wheel and driven wheels are formed as a gear wheel.

6. The simplified sound reproducing device of claim 1, wherein said rotational motion transferring means comprises a belt from said motor coupled to said record disc.

* * * * *